Nov. 3, 1970     R. WEIDMANN     3,538,311
METHOD AND APPARATUS FOR THE AUTOMATIC
ACCOUNTING OF PURCHASED ITEMS
Filed Nov. 23, 1966     2 Sheets-Sheet 1
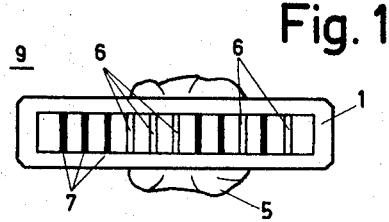
Fig. 1
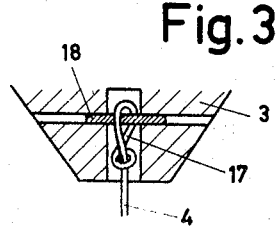
Fig. 3
Fig. 2
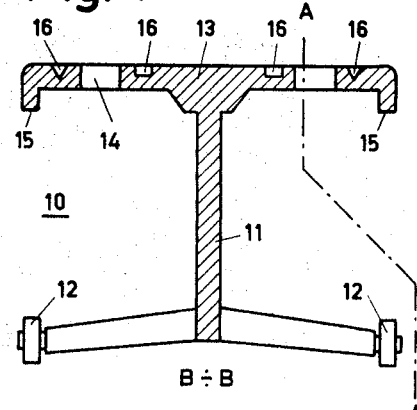
Fig. 4
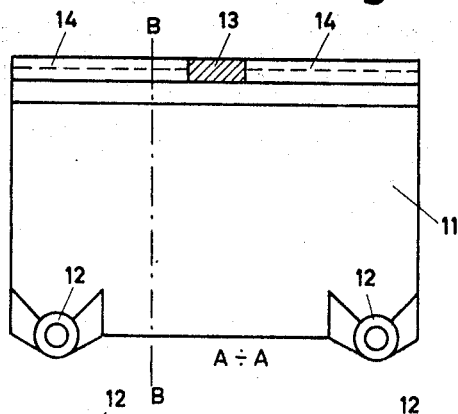
Fig. 6
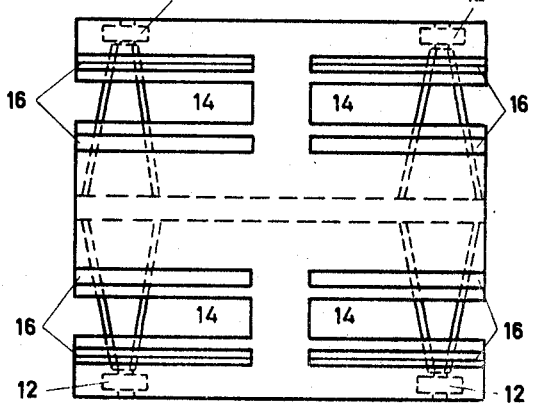
Fig. 5
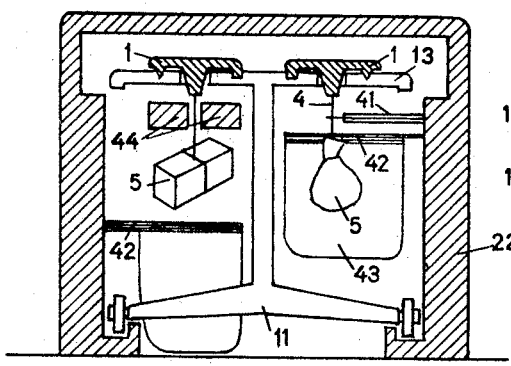
Fig. 11

United States Patent Office 3,538,311
Patented Nov. 3, 1970

3,538,311
METHOD AND APPARATUS FOR THE AUTO-
MATIC ACCOUNTING OF PURCHASED ITEMS
Robert Weidmann, Uster, Switzerland, assignor to
Zellweger Ltd., Uster, Switzerland
Filed Nov. 23, 1966, Ser. No. 596,693
Claims priority, application Switzerland, Nov. 24, 1965,
16,363/65
Int. Cl. G06k 7/08, 19/06
U.S. Cl. 235—61.11                                    8 Claims

ABSTRACT OF THE DISCLOSURE

A support device for carrying items of sale, which device is marked with magnetic elements in a binary fashion indicative of the sales price of the item. There is also disclosed herein a rack capable of carrying the items of sale by the support devices with keying slots provided to insure a particular orientation of the devices on the rack. There is also disclosed an accounting arrangement including a pair of reading heads for reading the pattern of the magnetic elements on each support device and processing circuitry for determining the price represented by each pattern of magnetic elements and for addition of all of the prices received in connection with a single rack.

In stores, especially in self-service stores, it is generally customary that the goods or items of merchandise selected by the customer for purchase be presented in a cart, basket or other suitable container at the cashier. The cashier removes the items separately from the container and keys the sales price into a cash register. The cash register adds up the individual prices and shows the customer the total amount. After paying for the articles, the purchased items are then transferred into shopping bags or the personal cart of the customer for removal from the store.

Each purchased article must, therefore, be handled individually by the cashier; and, after reading off the sales price and keying this price into the cash register, he must then pack the items into bags for the customer. This is a difficult and time consuming procedure, not only because the purchased items must be handled repeatedly by the cashier, but also because he must know or be able to determine the price of each of the sales items selected. In a large store carrying many sales items it is very difficult for the cashier to know the price of all items and some items cannot be physically marked with a price. The result is more loss of time. The great savings in time characteristic of the self-service principle is therefore lost at the cash register, which operation in contrast to self-selection of the items by the customer is quite time consuming. The proposed advantages in the present day self-service stores is therefore by far not accomplished.

The result is that during rush hours, lines of waiting customers form because dispatching at the cash register does not keep up with the flow of customers. By this waiting period, at least part of the time gained by the customer through the self-service principle, is again lost. An increase in the number of cash registers for the stagnation-free process of cashiering is possible only to a limited degree for reasons of space requirements and especially shortage and high cost of personnel.

The present invention is directed toward elimination of the cited disadvantages and relates to a method and device for automatic accounting of purchased items in self-service stores and the like in which each sales item is attached to a suspension device, marked for the particular item and displayed in the store and in which the items, selected by the customer, are fed to at least one accounting station at which the markings, provided on the suspension devices, are automatically read and transformed into the sales price, effective at that time. The totals are then produced and shown to the customer.

The present invention also encompasses a device for accomplishing the above-described method in the form of the suspension devices which are connected to the sales items and which are marked with the number of the sales item and further includes an accounting arrangement for conversion of the markings provided on the suspension devices into sales price.

Advantageously, the customer is asked to carry the article selected for purchase on a rack of special construction. Furthermore, it is advantageous that, after paying the total sales cost, a separation device is provided by which the articles carried by the rack are separated from the suspension device and fall into a collecting container.

It is therefore an object of the present invention to provide method and apparatus for completely automatically determining the total sales price of a plurality of selected sales items and for packaging said items.

It is another object of the present invention to provide a device in connection with each sales item which is capable of identifying the item to a mechanized accounting arrangement.

It is a further object of the present invention to provide a mechanized accounting arrangement which will automatically identify the items of sale selected, determine the price of each item and the total price of the items, and package the items.

It is still another object of the present invention to provide means in combination with the accounting arrangement for preventing efforts to intentionally mislead the accounting arrangement by fraudulent schemes.

These and other objects, features and advantages of the present invention will become more apparent from the following detailed description of the invention, when taken with the accompanying drawings, which disclose an exemplary embodiment of the present invention, and wherein:

FIGS. 1 and 2 show a suspension device for a sales item in top view and elevation.

FIG. 3 shows a detail of the suspension device.

FIGS. 4, 5 and 6 show a transportable sales item rack in front view, top and side view.

FIG. 11 shows the sales item rack with the sales items at the time when the articles are released into a collecting container.

Figure 7:
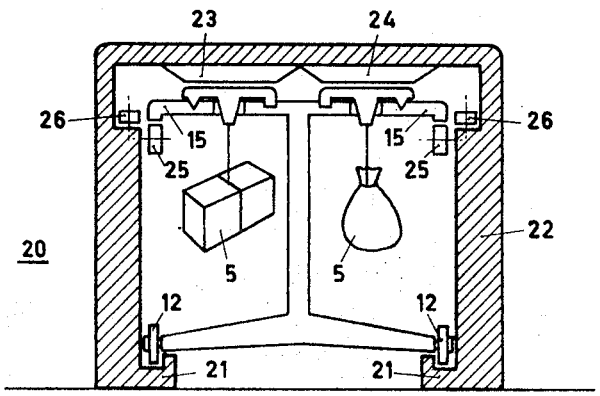
FIG. 7 shows a sales item rack placed in a central accounting arrangement.

Looking now to the drawings, wherein like reference numerals have been used to designate like elements throughout the views, in FIGS. 1 and 2 there is shown a suspension device 9 in accordance with the present invention. It consists of a handle 1 preferably made of synthetic material making them light-weight and inexpensive to produce. The ends of each suspension device serve as support surfaces 2 with opposite ends having a different configuration, for reasons to be explained hereinafter, a retainer portion 3 is provided to which a cord 4 or the like is fastened. Fastening of cord 4 to handle 1 is accomplished, for example, as shown in FIG. 3, the end of the cord 4 which forms a loop 17 is held by a bolt 18 pressed into the retainer member 3. A sales item 5 is attached to the cord 4. The connection between cord 4 and the sales item 5 may, for example, be accomplished by means of a seal for protection against illegal removal.

On the upper side of the handle 1, for example, a plurality of recesses 6 having a rectangular cross-section are provided into which may be selectively inserted an article marking element or indicia which identifies the article 5 attached to it. Identification of the article is advantageously so selected that it can be accomplished, as explained later, by electronic reading means. For example, soft-iron rods 7 may be used as the indicia whereby the number and the position of these soft-iron rods 7 in the various recesses 6 positively identify the respective sales item 5 by means of a code. The arrangement of these soft-iron rods 7 may, for example, be accomplished in such a manner that a binary code results therefrom in which to each position represented by a recess 6 in the handle 1, a value of 1 or 0 is assigned, depending on whether or not the position is occupied by a soft-iron rod 7 or is empty. With $n$ positions, $2^n$ article markings may be accommodated. A cover 8 protects the articles markings from external interference or unauthorized access. While I have illustrated a particular marking scheme by way of example, it should be apparent that an article does not have to be contained in the handle 1. It can, for example, be suitably imprinted into the cord 4 or elsewhere as well.

In principle, it would be possible to mark the sales articles, directly with the sales price. However, this has the disadvantage that with each change in price, the marking of all items affected by the price change would have to be changed or exchanged. Therefore, it is advantageous to identify the article and to ring off the prices, effective at that time, in an accounting arrangement 20. The way this may be done is described below.

The customer, as he enters the store, takes a transportable article rack 10 as shown, for example, in FIGS. 4, 5 and 6. On the central support 11 of the article rack 10, which is carried on wheels 12, a table-like plate 13 is attached. Open slots 14 are provided in this plate against or toward the front and rear sides thereof into which the suspension devices 9 may be inserted so that their support surfaces 2 rest on the plate 13 while the sales item 5 hangs underneath the slot 14 through which cord 4 passes. Plate 13 has the further task to force the customer to place all handles of the articles 5 selected by him in the same direction and in the same position in relation to an accounting device 20 to be described later. For this purpose, the plate 13 may be provided with shaped guides 16 corresponding to the distinctive shape of surfaces 2 which will permit the handles 1 to be properly seated only in a definite position of desired orientation which will be readily apparent to the customer who does not exercise particular care. The article rack 10 advantageously is provided with guide surfaces 15 which, by means of support and transport means cooperate inside an accounting arrangement 20 (to be described later).

After completing the selection of the sales articles 5, the customer brings the article rack 10 to the accounting arrangement 20 (see FIG. 7) which is advantageously placed adjacent the cash register. The article rack 10 is inserted on tracks 21 into a tunnel-like housing 22 of the accounting arrangement 20, where the guide surfaces 15 of the article rack 10 are grasped by motor-driven transport rollers 25 to thereby lift the article rack 10 off the tracks 21 and drive it through the housing 22. Rollers 26 serve for laterally guiding the article rack 10.

Figure 9:
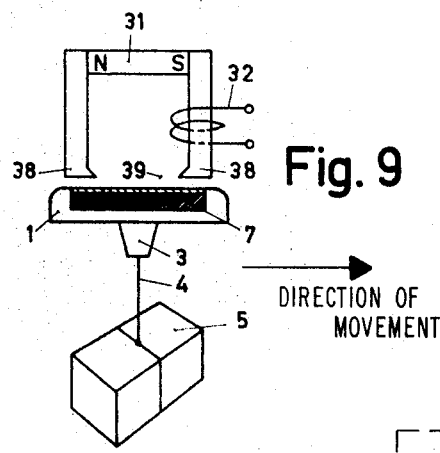
FIGS. 8, 9 and 10 show exemplified means for the conversion of item marking provided in the suspension device into sales price.
Figures 8, 10:
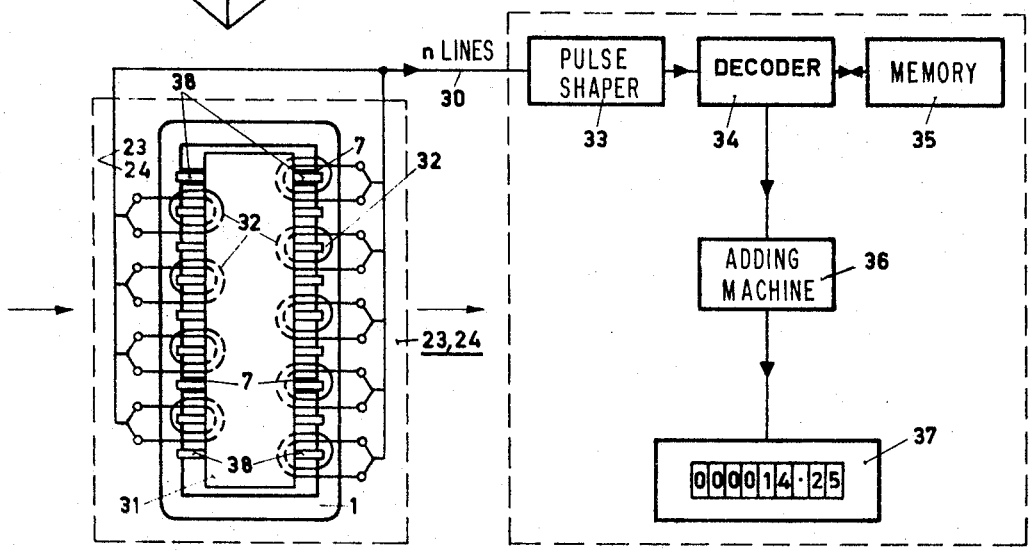

Above the two tracks of the handles 1, which, as mentioned above, are properly oriented in their position by appropriate guide surfaces 16 in the rack, reading heads 23 and 24 respectively are arranged to read the article marking or indicia 7 on the handles 1. How the reading may, for example, be accomplished in accordance with the invention is described in connection with FIGS. 8, 9 and 10. Each of the reading heads 23 and 24 is provided with at least one permanent magnet 31. To this permanent magnet 31 for each reading head $n$ pairs of pole pieces 38 are connected to the magnet and so arranged that a series of air gaps 39 are formed thereby across the path of the handles and spaced so as to be in alignment with the passing spaces 6 in each handle. As a result thereof, during passing of the soft-iron rods 7 inserted in the handle 1 the corresponding air gaps between pairs of pole pieces 38 will be bridged over. When at the respective positions in the handle 1 a soft-iron rod 7 is inserted, an increased magnetic flux is created in the circuit consisting of pole piece 38, magnet 31, pole piece 38 and air gap 39 due to presence of the rod 7 in the air gap, which reduces the impedance of the air gap. During passage of a handle 1 this increased magnetic flux induces current impulses in corresponding coils 32 wound on one pole piece 38 of each pair, indicating a binary "1" condition. If, at the respective position in the handle 1, no soft-iron rod 7 is present, then the magnetic flux remains constant and no current impulse is produced, thereby indicating a binary "0" condition. Each of the $n$ coils 32 is connected individually to an impulse shaper 33 with its own line 30.

During passage of a handle 1 beneath the reading head 23 or 24, respectively, current impulses are produced in those coils 32 and their corresponding lines 30 in which the space in the handle corresponding to it in position is provided with a soft-iron rod 7. The thus created impulse groups and their placement in the $n$ lines are therefore clearly identified by a coded pulse group indicating the passing sales article 5. The impulse shaper 33 in itself transforms the mentioned current impulses, for example, into further usable rectangular impulses and as such may take the form of any wave shaping circuitry capable of performing such a task.

In a price memory store 35, the prices corresponding to the article markings are contained, for example, in the form of coded impulse combinations. These prices may be adjusted at any time by the service personnel through exchange of price storage standards or units which contain the above mentioned impulse combinations. A decoder 34, which may, for example, take the form of a well known diode matrix configuration, gates the corresponding price as stored in the price memory store 35 for each arriving impulse group and forwards it to an adding machine 36 which adds the prices of the consecutively arriving items on the article rack 10 and shows the total at a price indicating device 37, which also may produce a printed receipt. Where prices cannot be predetermined as, for example, in the sale of meat, the described method may also be used by assigning, for example, a specific article number for a series of incremental price steps. A particular number is then placed on the handle 1 carrying the article, instead of the previously used article identifying number, which number will then be evaluated by the memory store 35 in the same manner as was described above.

Inasmuch as the reading of the article markings in the handle 1 and the transformation of the impulses into price figures is accomplished by electronic means, the amount of time required for passage of the article rack 10 including calculation and indication of the total cost of the purchase is very small. The customer must then pay for the purchase which may be done with the help of known automatic money changing machines, or by a cashier who need only collect money and make change.

Naturally, other systems could be used which would provide an electronically readable article marking in the handles 1. For example, the spaces 6 in the handle 1 can be occupied by means which reflect or absorb electromagnetic or spectral rays such as light, etc., whereby the magnitude of the reflected portion provides a binary indication of the evaluation of the article marking.

Also, systems are feasible, in which, by the passage of the suspension devices 9, electric contacts are momentarily closed, as in the case with punch cards. In place of punch cards, the suspension device 9 may be provided with mechanical humps which operate the electric contacts. Through closing of the mentioned contacts, rectangular impulses will be produced, for example, in an electrical circuit which may be used for further evaluation of the article markings.

In order not to lose the time saved prior to handing the customer the articles for which he paid by time consuming packaging by hand, it is advantageous if the transfer of the articles 5 is accomplished automatically the customer is handed the purchased merchandise in a collecting container 43, as is shown, for example, in FIG. 11. After passage of the handles 1 underneath the reading heads 23 and 24, respectively, the cords 4 arrive at a separating device 41 which cuts off the cords 4. In the meantime a holder 42 together with a collecting container 43, such as a paper bag or sack to be given to each customer has passed underneath the separation station so that the articles 5 fall into the collecting container 43. It is also possible to coordinate the cord cutting operation with a lifting of holder 42 and container 43 to prevent a dropping of fragile goods by a long distance into the container. After the cords 4 of all handles 1 have been severed, which is, for example, determined by the fact that the article rack 10 has reached a certain position—the holder 42 swings towards the outside and makes it possible for the customer to pick up the collecting container 43. The handles 1 may be used for further sales articles 5 whereas the empty article racks 10 are again available to new customers.

As a further features of the invention, the possibility exists that through misuse or fraud, incorrect amounts could be exchanged for the designations on an article carrying handle 1 and corresponding safely precautions must be taken to prevent this. It its, for example, feasible that a customer, unnoticed, ties an expensive article to the handle 1 by means of cord 4, the article marking of which corresponds to a cheaper article 5. For this purpose and during passage of the article rack 10 through the accounting device 20, the cord 4 may be passed through a checking device 44 which responds to abnormal dimensions of the cord 4 to release appropriate reactions in the accounting device 20. An uncontrolled passage of articles 5 in the article rack 10 would be avoided thereby. It is also possible that the article rack 10 be made bottomless and that the table-like plate 13 be checked as to its profile as it passes through the tunnel-like housing 22 of the accounting device 20. If, by mistake, articles 5 are set into plate 13 instead of being suspended from a handle, they will be pushed off by the accounting device 20 and can, therefore, be prevented from passing through unaccounted.

A further advantageous possibility of the inventive method resides therein, that the article markings determined or sensed by the reading heads 23 and 24 could be used in such a manner that for each article 5 an impulse combination is assigned for statistical registering the frequency of consumption of the respective article 5 which can be evaluated for the supervision of stock on hand and for issuing of subsequent additional shipping requests. For example, this can be accomplished in such a manner that the impulse group is generated by the passage of each article 5, suspended on the suspension device 9 in an accounting arrangement 20 is fed to an evaluation apparatus in which the stock on hand of each article is stored. Each of the incoming impulses groups reduces the booked stock of the respective article by one unit, so that at any time, the existing stock of each article may be extracted from the evaluation apparatus.

Additionally, aside from control of stock on hand, a predetermined stock minimum may be stored in the above mentioned evaluation apparatus for each article and after arriving at this stock minimum, an alarm could be sounded.

The invention being thus described, it will be obvious that the same may be varied in many ways. Such variations are not to be regarded as a departure from the spirit and scope of the invention and all such modifications are intended to be included within the scope of the following claims.

What is claimed is:

1. Method for automatically accounting purchased sales articles in stores and the like comprising:
   suspending each of the sales articles by a supporting strand from a device carrying a nummerical designation identifying the article,
   storing the price of each article with the article designation,
   arranging each of the sales articles in series with a prescribed orientation,
   moving said series of articles past a numerical designation detector,
   converting said designation to corresponding sales prices,
   totaling said sales prices to provide a total price,
   displaying said total price,
   separating at a station each of the articles from the device carrying the numerical designation,
   collecting the separated articles in a receptacle which is given to the purchaser, and
   checking the supporting strand of each of the sales articles for abnormal dimensions prior to separation thereof so as to prevent fraud or misuse.

2. An arrangement for automatically accounting purchased sales articles in stores and the like comprising:
   at least one suspension device secured to a sales article;
   said suspension device including a substantially rectangular body member having a transverse central aperture extending to one surface and a retaining pin in said aperture for retaining a supporting strand, a plurality of parallel grooves on one surface of said body member opposite to the surface containing said aperture, a metal bar disposed in at least one of said grooves so as to provide a binary grouping of indicia constituting a numerical designation uniquely identifying the article attached thereto, and at one end thereof a profiled portion of one geometrical shape and at the other end thereof a profiled portion of different geometrical shape;
   an article rack adapted to carry said at least one suspension device and the associated articles, said rack being provided with a plurality of aligned pairs of impressions of geometrical shapes corresponding to the geometrical shapes of the respective profiled ends of said at least one suspension device to insure prescribed orientation of said device on said rack and wherein said article rack is mobile so as to facilitate transportation of said articles to an accounting means;
   said accounting means being provided to detect said numerical designations on each selecting suspension device and article combination and for converting said designations to sales prices for summing.

3. An arrangement as defined in claim 2, wherein said article rack includes a substantially horizontal planar top member carrying said aligned impressions, a vertical support member connected to said top member and having a plurality of legs attached thereto, each leg having at least one rotatable wheel attached thereto, said top member having at least one slot therein through which said articles are suspended from said at least one suspension device, wherein said aligned impressions are located on either side of said at least one slot.

4. An arrangement as defined in claim 2, wherein said sales articles are suspended from said suspension device by severable strands and said accounting means includes means for severing said strands in response to detection of the numerical designation on the associated suspension device.

5. An arrangement as defined in claim 2, wherein said accounting means includes a housing means and drive means within said housing means to drive said article rack therethrough so as to detect the numerical designation of said at least one suspension device supported thereon.

6. An arrangement as defined in claim 5, wherein said accounting means also includes a plurality of magnetic reading heads arranged to detect the presence or absence of said at least one metal bar thereby generating a plurality of electric impulses corresponding to the binary pattern of said at least one metal bar.

7. An arrangement as defined in claim 6, wherein said accounting means further includes memory means for storing the current price of each sales article and its numerical designation, decoding means connected to said reading heads and said memory means responsive to said plurality of electrical impulses for providing a signal indicative of the price of the associated article as derived from said memory means, evaluation means connected to said reading heads for providing a statistical count of the amount of each article purchased to monitor the stock volume and the turnover of sales articles, switch means for energizing said reading heads, mechanical means on said at least one suspension device for operating said switch means.

8. An arrangement as defined in claim 1, wherein said accounting means further includes alarm means connected to said evaluation means for providing indication of a stock minimum condition of any article, adding means connected to said decoder means for summing the prices of the articles selected and detected by said reading heads, and means for checking the supporting strand of each article for abnormal dimensions.

References Cited

UNITED STATES PATENTS

| | | | |
|---|---|---|---|
| 1,762,196 | 6/1930 | Schellentrager | 177—61 XR |
| 2,746,679 | 5/1956 | Stratton et al. | 235—61.6 |
| 2,848,163 | 8/1958 | Serrell | 235—61.12 |
| 2,919,851 | 1/1960 | Otis | 235—91.14 |
| 3,059,112 | 10/1962 | Rogal | 235—91.14 |
| 3,074,353 | 1/1963 | Devonshire et al. | |
| 3,111,576 | 11/1963 | Lipschutz | 235—61.114 |
| 3,168,053 | 2/1965 | Miroux | 198—38 XR |
| 3,203,530 | 8/1965 | Sgriccia et al. | 198—38 |
| 3,227,886 | 1/1966 | Dunigan et al. | 198—38 XR |
| 3,317,714 | 5/1967 | Hausler et al. | 235—61.114 |

DARYL W. COOK, Primary Examiner

R. M. KILGORE, Assistant Examiner

U.S. Cl. X.R.

235—61.12